United States Patent
Faust et al.

(10) Patent No.: US 10,343,469 B2
(45) Date of Patent: Jul. 9, 2019

(54) HITCH HOOK WITH SLIDING LATCH

(71) Applicant: Deere & Company, Moline, IL (US)

(72) Inventors: Jeremy J. Faust, Ottumwa, IA (US);
Stephen K. Parsons, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 126 days.

(21) Appl. No.: 15/460,842

(22) Filed: Mar. 16, 2017

(65) Prior Publication Data

US 2018/0264900 A1    Sep. 20, 2018

(51) Int. Cl.
B60D 1/58    (2006.01)
B60D 1/04    (2006.01)
B60D 1/28    (2006.01)
B60D 1/00    (2006.01)

(52) U.S. Cl.
CPC .............. B60D 1/04 (2013.01); B60D 1/28 (2013.01); *B60D 2001/008* (2013.01)

(58) Field of Classification Search
CPC ..... B60D 1/583; B60D 1/04; B60D 2001/008
USPC ........................................................ 280/509
See application file for complete search history.

(56) References Cited

U.S. PATENT DOCUMENTS

| 4,133,553 A | 1/1979 | Pierce |
| 5,769,559 A | 6/1998 | Olson |
| 6,467,793 B2 * | 10/2002 | Putnam ................. B60D 1/065 280/436 |
| 6,776,432 B2 | 8/2004 | Harkcom et al. |
| 7,478,824 B2 | 1/2009 | Buerkle et al. |
| 8,708,362 B2 | 4/2014 | Terpsma et al. |
| 8,746,725 B2 | 6/2014 | Harkcom et al. |
| 8,752,856 B2 | 6/2014 | Sarajian et al. |
| 8,764,042 B2 | 7/2014 | Afting |

FOREIGN PATENT DOCUMENTS

| CN | 201406026 Y | * | 2/2010 | |
| CN | 107792801 A | * | 3/2018 | |
| GB | 1117087 A | * | 6/1968 | ............... B60D 1/02 |
| GB | 1295710 A | * | 11/1972 | ............... B60D 1/04 |

OTHER PUBLICATIONS

Kuhn North America, Swivel Hitch photographs, admitted prior art.

* cited by examiner

*Primary Examiner* — Jacob D Knutson
(74) *Attorney, Agent, or Firm* — Klintworth & Rozenblat IP LLP (57) ABSTRACT

A hitch hook includes a hook body with a hook opening configured to removably receive a pin of another work vehicle. The hitch hook further includes a latch that is slideably supported on the hook body between a first position and a second position relative to the hook body. The hook opening is open when the latch is in the first position, and the latch is configured to retain the pin within the hook opening when the latch is in the second position. The hitch hook additionally includes a retainer that is configured to retain the latch in the second position.

18 Claims, 9 Drawing Sheets

HITCH HOOK WITH SLIDING LATCH

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and, more specifically, to hitch configurations for towing implements of the work vehicles.

BACKGROUND OF THE DISCLOSURE

Some work vehicles may be configured for towing implements or other work vehicles in a vehicle train. A towing vehicle may removably connect (i.e., hitch) to a towed vehicle/machine via a drawbar and hitch arrangement. As such, the towing vehicle may propel and direct the towed vehicle/machine through a work site. Additionally, in some embodiments, the towing vehicle may be configured to supply mechanical, electrical, hydraulic, or a different type of power to the towed vehicle/machine for operating various work or drive components.

A typical work vehicle train may have a drawbar extending from the towing vehicle. A first hitch component may be mounted to the drawbar. Another hitch component may be mounted to a draft bar or tongue of a towed vehicle/machine. In some cases, the towed hitch components may include a hook configured to receive a pin mounted to the towing vehicle. When the hook engages the pin, the towing vehicle may tow the towed vehicle/machine. When unhooked, the towing vehicle and the towed vehicle/machine may be uncoupled.

SUMMARY OF THE DISCLOSURE

This disclosure provides a hitch hook for hitching a towed vehicle and a towing vehicle together. The hitch hook includes various features that facilitate hitching and/or unhitching of the vehicles.

In one aspect, the disclosure provides a hitch hook for a towing operation between a plurality of work vehicles. The hitch hook includes a hook body configured to mount on one of the plurality of work vehicles. The hook body includes a hook opening configured to removably receive a pin of another of the plurality of work vehicles. The hitch hook also includes a latch that is slideably supported on the hook body between a first position and a second position relative to the hook body. The hook opening is open when the latch is in the first position, and the latch is configured to retain the pin within the hook opening when the latch is in the second position. Additionally, the hitch hook includes a retainer that is configured to retain the latch in the second position.

In another aspect, a method of operating a hitch hook is disclosed. The method includes receiving a pin within a hook opening of a hook body while a latch that is supported by the hook body is in a first position. The method further includes sliding the latch from the first position to a second position. The latch retains the pin within the hook body when in the second position. Moreover, the method includes retaining the latch in the second position with a retainer.

In additional aspects, the disclosure provides a work vehicle with a chassis and a hitch hook that is mounted to the chassis. The hitch hook includes a hook body configured to mount on one of the plurality of work vehicles. The hook body includes a hook opening configured to removably receive a pin of another of the plurality of work vehicles. The hook body includes a projection. The hitch hook also includes a latch that is slideably supported on the hook body between a first position and a second position relative to the hook body. The hook opening is open when the latch is in the first position, and the latch is configured to retain the pin within the hook opening when the latch is in the second position. The hitch hook additionally includes a pin abutment member that is supported by the latch and that is configured to abut against the pin to indicate that the pin is generally aligned with the hook opening when hitching the hitch hook and the pin. Moreover, the hitch hook includes a retainer that is pivotally attached to the latch for movement between a retracted position and an extended position. The retainer is configured to abut the projection and retain the latch in the first position when the retainer is in the retracted position. The retainer and the latch are configured to abut the projection and retain the latch in the second position when the retainer is in the retracted position. The retainer is configured for moving the latch between the first position and the second position when the retainer is in the extended position. The retainer includes a handle configured for manually moving the latch between the first position and the second position.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of a hitch hook for work vehicles, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of the disclosed hitch hook for towing operations between multiple work vehicles as shown in the accompanying figures. The disclosed hitch hook, its method of manufacture and assembly, and its method of operation provide a number of benefits as compared to conventional hitch hooks.

The hitch mount assembly of the present disclosure may include various features that facilitate hitching a towed vehicle and a towing vehicle together. The hitch mount assembly may also include features that facilitate unhitching the towed vehicle from the towing vehicle.

More specifically, the hitch hook of the present disclosure may include a hook body configured to be mounted to one work vehicle. The hook body may include a hook opening configured to removably receive a pin that is mounted on another work vehicle. The hitch hook may also include a latch that is moveably supported on the hook body. In some embodiments, the latch may be slideably supported on the hook body between a first position and a second position. In the first (unlatched) position, the hook opening may be open to receive the pin and to remove the pin from the hook opening. In the second (latched) position, the latch may substantially close the hook opening, for example, to retain the pin within the hook opening. In other words, in the second position of the latch, the latch and the hook body may cooperate to retain the pin within the hook opening. The sliding action of the latch provides ergonomic benefits during the hitching and unhitching operation.

Additionally, the latch may engage the pin at multiple locations, which are separated apart at a distance. As such, forces between the pin and the hitch hook may be distributed across the hitch hook.

The hitch hook may further include a retainer for retaining the latch at least one position relative to the hook body. The retainer and/or other portions of the hitch hook may define a user-friendly handle that facilitates latching and unlatching. Additionally, the retainer and/or handle may be mounted to the latch to further facilitate these operations. Additionally, the hitch hook may include at least one biasing member for biasing the retainer, ensuring that the hitch hook remains hooked to the pin of the other work vehicle.

In addition, the hitch hook may include an abutment member. The abutment member may abut against the pin, drawbar, or other opposing surface of the other vehicle during the hitching operation to assist the user in aligning and hitching the work vehicles together.

Moreover, the hitch hook may provide various manufacturing advantages. For example, the hitch hook may be assembled with relatively few parts. These parts may be manufactured and assembled in an efficient manner.

Figure 1:
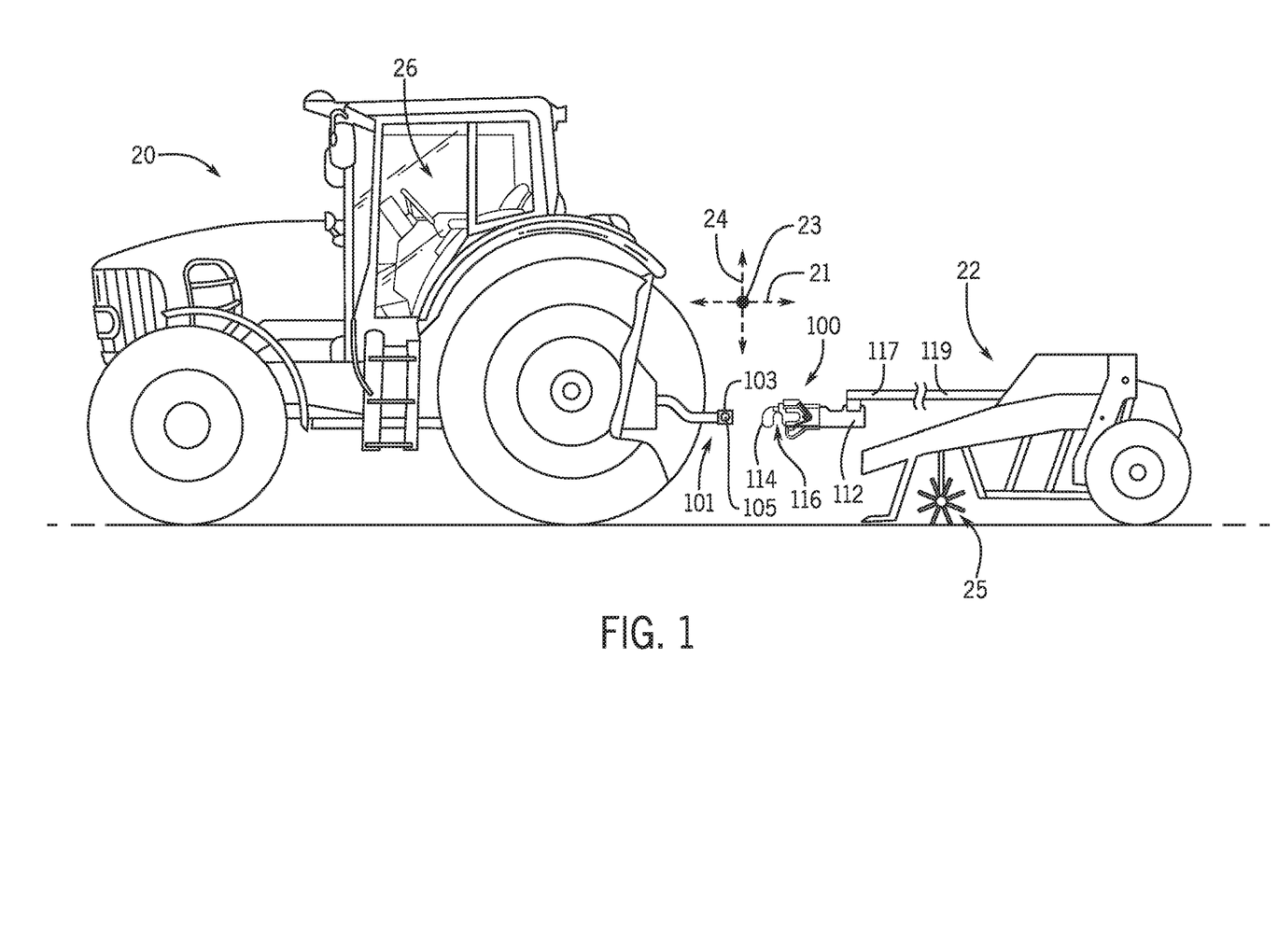
FIG. 1 is a side view of example work vehicles, including a towing vehicle and a towed vehicle, which may be hitched together and unhitched from each other using a hitch hook of the present disclosure.

FIG. 1 illustrates a plurality of work vehicles arranged in a work vehicle train. For example, the work vehicle train may include a towing vehicle 20 and a towed vehicle 22. The towing vehicle 20 and the towed vehicle 22 may be attached via a hitch hook 100. More specifically, one vehicle may include the hitch hook 100, and the other vehicle may include a drawbar 101 with a drawbar extension 103. The drawbar extension 103 may include a pin 105, which is configured to removably attach (i.e., hitch) to the hitch hook 100.

A Cartesian coordinate system is included in FIG. 1 for reference purposes. As shown, the hitch hook 100 may extend horizontally along a longitudinal axis 21 toward the drawbar extension 103 and the pin 105. The pin 105 may extend horizontally along a lateral axis 23 (i.e., a cross-vehicle direction). A vertical axis 24 is also included in FIG. 1 for reference purposes.

The hitch hook 100 is shown unhitched from the pin 105 in FIG. 1. The hitch hook 100 may hook onto the pin 105 (i.e., receive the pin 105, engage the pin 105, connect to the pin 105, etc.) to hitch the vehicles 20, 22 together. To unhitch, the hitch hook 100 may unhook from the pin 105 (i.e., disengage from the pin 105, disconnect from the pin 105, etc.).

In the embodiment of FIG. 1, the towed vehicle 22 includes the hitch hook 100, and the towing vehicle 20 includes the drawbar extension 103 and pin 105. However, it will be appreciated that, in other embodiments, the towing vehicle 20 may include the hitch hook 100 and the towed vehicle 22 may include the drawbar extension 103 and pin 105.

The towing vehicle 20 and towed vehicle 22 may be of any suitable type. For example, the towing vehicle 20 may be a tractor or other towing work vehicle. The towing vehicle 20 may include an operator cabin 26 with various user controls (e.g., steering wheel, control panels, pedals, and the like) for controlling the towing vehicle 20. Also, the towed vehicle 22 may include an implement 25 configured for agricultural, forestry, construction, or other work. In the embodiment of FIG. 1, for example, the towed vehicle 22 is a mower/conditioner, and the implement 25 includes a plurality of mower blades for cutting grass, hay, or another agricultural product. However, the towed vehicle 22 and/or implement 25 could be of another type without departing from the scope of the present disclosure. For example, the implement 25 may be a sprayer implement, a seeding implement, etc., and the towed vehicle 22 may support movement of that implement 25.

Also, in some embodiments, the towing vehicle 20 may be self-powered for movement via an internal combustion engine, an electric motor, a hydraulic actuator, or other power source. In contrast, the towed vehicle 22 may be unpowered and, thus, moved via the towing operations described herein. However, it will be appreciated that the towing vehicle 20 and the towed vehicle 22 may be powered or unpowered machines without departing from the scope of the present disclosure. On a related note, the term "vehicle" is used generally herein to describe a machine configured for movement across a work site, regardless of whether it is self-powered for such movement.

In some embodiments, the hitch hook 100 may be configured as a swivel tongue hitch hook. As such, the hitch hook 100 may be attached to the towed vehicle 22 via a connector bar, strut or other structure that swivels about the vertical axis 24. Thus, in some embodiments, the towed vehicle 22 may travel along a horizontal path that is offset laterally from the path of travel of the towing vehicle 20.

Also, in some embodiments, connections between the towing vehicle 20 and the towed vehicle 22 may include a driveline that transfers power from a power-take-off (PTO) drive assembly of the towing vehicle 20 to a powered element of the implement 25. The PTO driveline of the implement 25 connects the PTO shaft of the towing vehicle 20 and a component mounted to the frame of the towed vehicle 22 (typically a gearbox assembly mounted on the towed vehicle 22). It will be appreciated that the vehicles 20, 22 may need to turn relative to each other during towing. Achieving these turns may require significant angular deviations between the towing vehicle 20 and the towed vehicle 22, which can cause similar angular deviations, for example, of the PTO driveline. Angular deviations in a PTO driveline can cause various difficulties. Thus, the hitch hook 100 may also be employed with a known swivel gearbox or and/or other similar components that allow relative turning action. The swivel gearbox assembly may allow components to rotate about the vertical axis 24 to thereby allow turning of the vehicles 20, 22. This swivel gearbox hitch system allows the PTO driveline to remain approximately straight, as the angular deviation between the towing vehicle 20 and the towed vehicle 22 occurs about the vertical axis 24 of the swivel gearbox.

Referring now to FIGS. 2-6, the hitch hook 100 will be discussed in greater detail. It will be appreciated that the hitch hook 100 may vary from the illustrated embodiment without departing from the scope of the present disclosure.

The hitch hook 100 may include a hook body 106. The hook body 106 is shown in isolation in FIG. 4. The hook body 106 may be a rigid, strong, elongate member. The hook body 106 may be somewhat rectangular and elongate to define a top side 108, a bottom side 110, a first vertical side 111, and a second vertical side 113. The hook body 106 may also include an attachment end 112 and a free end 114. The attachment end 112 and the free end 114 may be separated apart along the longitudinal axis 21 of the hitch hook 100. In some embodiments, a width 132 of the hook body 106 (FIG. 4) may remain substantially constant from the attachment end 112 to the free end 114 of the hook body 106. Also, in some embodiments, a thickness 134 of the hook body 106 at the attachment end 112 may be different from the thickness 134 at the free end 114. For example, in some embodiments, the thickness 134 of the attachment end 112 may be generally less than the thickness 134 of the free end 114.

Figure 4:
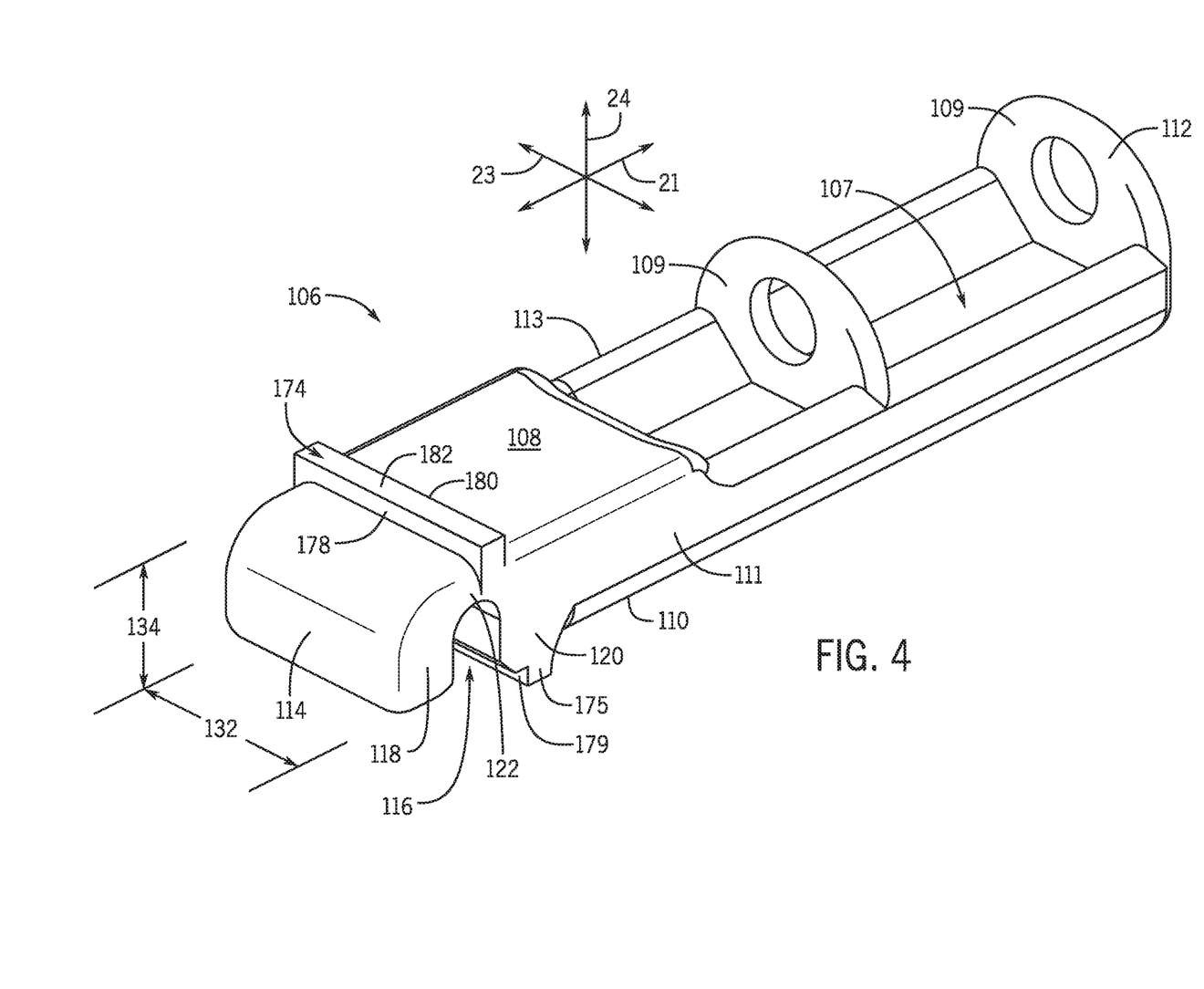
FIG. 4 is a perspective view of a hook body of the hitch hook of FIG. 2.

Moreover, as shown in FIG. 4, the hook body 106 may include a first projection 174. The first projection 174 may be a rib, lip, or other elongate projection on the top side 108 of the hook body 106. The first projection 174 may extend along the lateral axis 23. The first projection 174 may include a forward wall 178, a rearward wall 180, and a top surface 182 that extends between the forward wall 178 and the rearward wall 180. The first projection 174 may extend across a majority of the top side 108 (e.g., across the entire top side 108 in the lateral direction).

Figure 5:
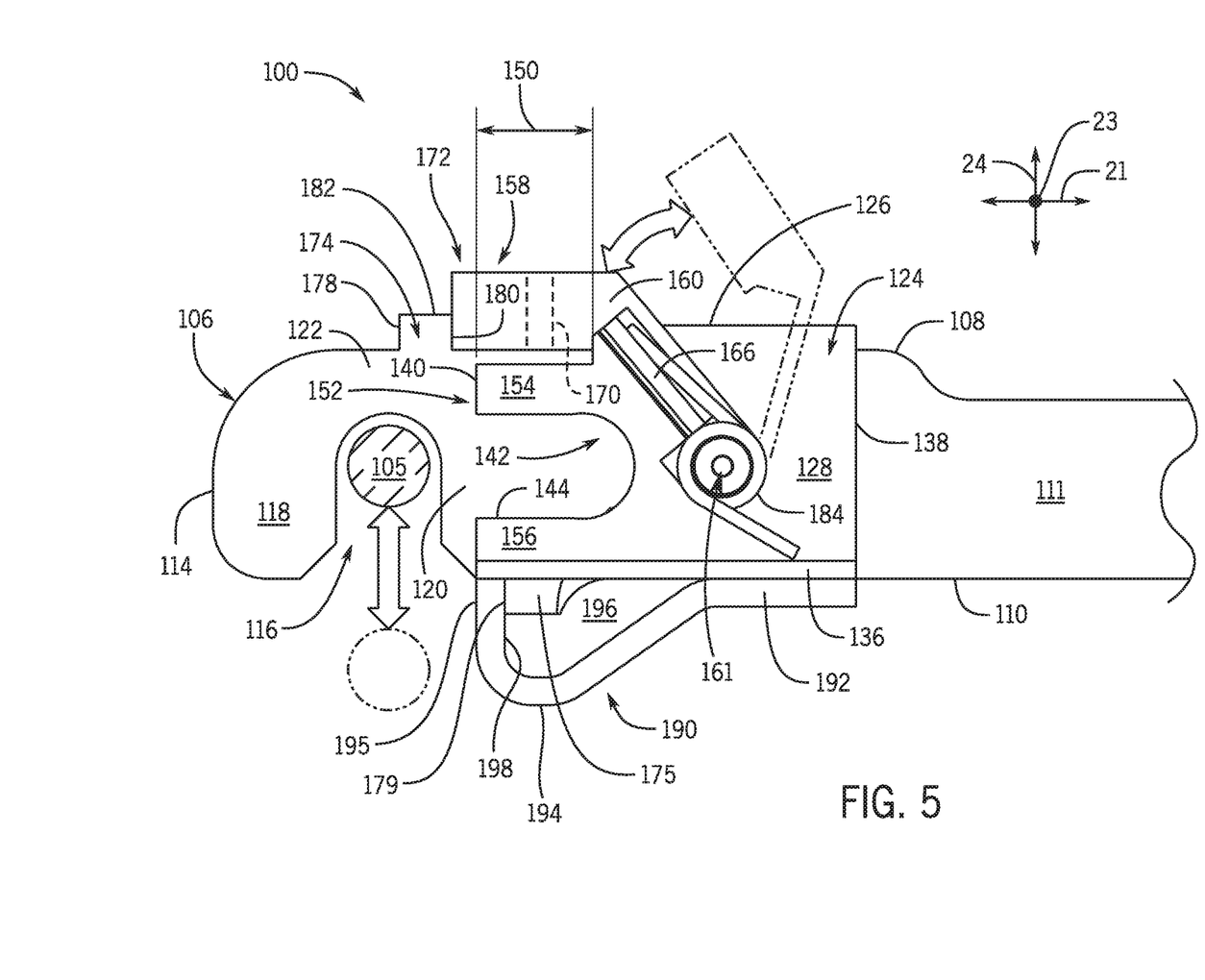
FIG. 5 is a side view of the hitch hook of FIG. 2 shown in the unlatched position relative to a pin of another vehicle.
Figure 6:
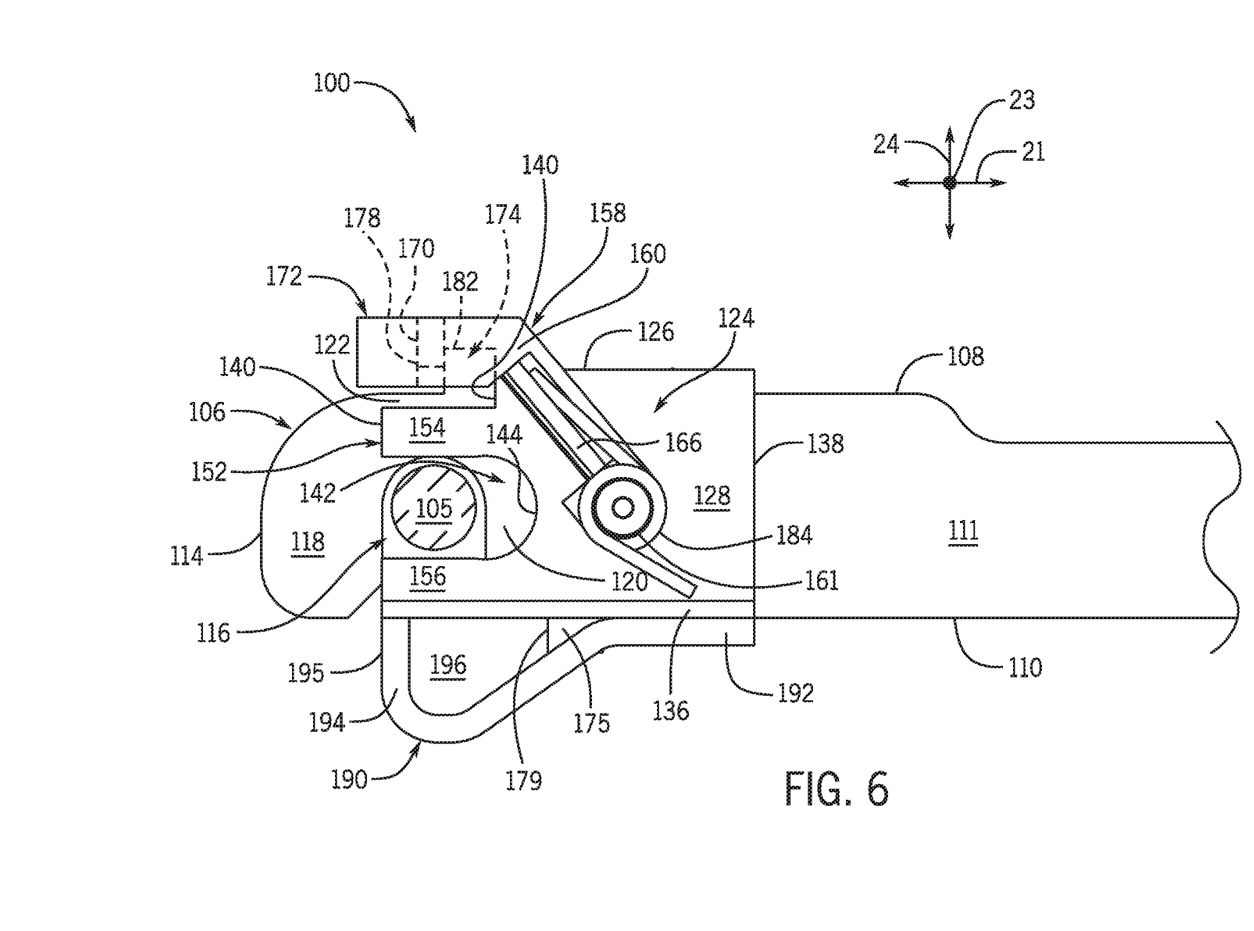
FIG. 6 is a side view of the hitch hook of FIG. 2 shown in the latched position relative to the pin of the other vehicle.

Additionally, the hook body 106 may include a second projection 175 (FIGS. 4, 5, and 6). The second projection 175 may be a rib, lip, or other elongate projection on the bottom side 110 of the hook body 106. The second projection 175 may extend along the lateral axis 23. The second projection 175 may include a forward wall 179 that faces forward along the longitudinal axis 21. The second projection 175 may extend across a majority of the bottom side 110 (e.g., across the entire bottom side 110 in the lateral direction).

The attachment end 112 of the hook body 106 may include a recess 107. The attachment end 112 may also include one or more flanges 109 that project vertically from the recess 107. The recess 107 may receive a support structure 117 of the towed vehicle 22 (FIG. 1). The support structure 117 may be connected to or comprise the chassis 119 of the towed vehicle 22 (FIG. 1). The flanges 109 may fixedly attach to the support structure 117 to mount the hitch hook 100 on the towed vehicle 22.

The free end 114 of the hook body 106 may include a hook opening 116. The hook opening 116 is configured to removably receive the pin 105 (FIGS. 5 and 6) to hitch the vehicles 20, 22 together. The hook opening 116 may extend along the lateral axis 23. Also, the hook opening 116 may be recessed into the bottom side 110 of the hook body 106. Accordingly, as indicated in FIG. 4, the hook body 106 may include a nose 118, an intermediate portion 120, and a connecting portion 122. The nose 118 and the intermediate portion 120 are separated along the longitudinal axis 21 by the hook opening 116. Also, the connecting portion 122 extends between the nose 118 and the intermediate portion 120 and may define at least part of the top side 108 of the hook body 106.

The hitch hook 100 may further include a latch 124 (FIGS. 2, 3, 5, and 6). The latch 124 may be constructed from one or more rigid and strong materials, such as relatively thick, bent, metal sheet stock. The latch 124 may generally have an inverted U-like shape so as to define an intermediate top side 126, a first side 128, and a second side 130. Also, the first side 128 and/or the second side 130 may terminate in a horizontally-projecting flange 136. The latch 124 may additionally include a rear edge 138 and a forward edge 140. The rear edge 138 may be oriented toward the attachment end 112 of the hook body 106, and the forward edge 140 may be oriented toward the free end 114 of the hook body 106. Also, as indicated in FIG. 5, the forward edge 140 along the intermediate top side 126 may be spaced apart at a longitudinal distance 150 away from forward edge 140 along the first side 128 and the second side 130.

The intermediate top side 126 may at least partially cover the top side 108 of the hook body 106. The first side 128 of the latch 124 may at least partially cover the first vertical side 111 of the hook body 106. The second side 130 of the latch 124 may at least partially cover the second vertical side 113 of the hook body 106. In some embodiments, the intermediate top side 126 may overlap and lie flat against the top side 108 of the hook body 106. Likewise, the first side 128 and second side 130 of the latch 124 may overlap and lie substantially flat against the first vertical side 111 and the second vertical side 113, respectively. The flange 136 may project away from the first vertical side 111 and, although not shown, the flange 136 on the second side 130 may project away from the second vertical side 113.

The latch 124 may be supported for movement on the hook body 106. In some embodiments, the latch 124 may be supported for sliding movement on the hook body 106. For example, the intermediate top side 126 may be supported for sliding movement along the longitudinal axis 21 by the top side 108 of the hook body 106. Likewise, the first side 128 and second side 130 of the latch 124 may be supported for sliding movement along the longitudinal axis 21 by the first vertical side 111 and the second vertical side 113, respectively. FIG. 5 shows an example of the latch 124 in an unlatched position, spaced rearward and away from the hook opening 116. FIG. 6 shows an example of the latch 124 in a latched position, disposed forward and proximate the hook opening 116. The latch 124 may slide between these latched and unlatched positions.

In some embodiments, the latch 124 may include at least one slide lock 152. FIGS. 2, 3, 5, and 6 shown one of the slide locks 152 on the first side 128 of the latch 124. The latch 124 may include a similar mirror-image slide lock 152 on the second side 130 of the latch 124.

The slide lock 152 may include an aperture 142 with an abutment surface 144. In some embodiments, the aperture 142 may be a notch or other type of opening that extends rearward from the forward edge 140 of the latch 124. Also, as shown, slide lock 152 may be defined by a first forward projection 154 and a second forward projection 156 that are separated along the vertical axis 24 by the aperture 142. The first and second forward projections 154, 156 may project substantially along the longitudinal axis 21, and the inner rim of the aperture 142 may continuously extend from forward edge 140 at the first forward projection 154 and back to the forward edge 140 at the second forward projection 156. The abutment surface 144 may be the inner rim of the aperture 142. The abutment surface 144 may be rounded and curved, for example, to correspond to the radii, cross sectional dimension, or other dimension of the pin 105.

The slide lock 152 on the first side 128 of the latch 124 may overlap the first vertical side 111 of the hook body 106, and the slide lock 152 on the second side 130 may overlap the second vertical side 113. As the latch 124 moves between the unlatched position (FIGS. 2 and 5) and the latched positions (FIGS. 3 and 6), the slide locks 152 may slide over the first and second vertical sides 111, 113, respectively.

When in the unlatched position, the first and second forward projections 154, 156 as well as the aperture 142 may be spaced apart (rearwardly) along the longitudinal axis 21 from the hook opening 116. Conversely, when in the latched position, the first and second forward projections 154, 156 as well as the aperture 142 may be disposed adjacent the hook opening 116. Also, the first and/or second forward projection 154, 156 may extend longitudinally across the respective lateral end of the hook opening 116. For example, as shown in FIG. 6, the second forward projection 156 may extend across the hook opening 116 between the intermediate portion 120 to the nose 118 of the hook body 106. This, in effect, closes off the lateral end of the hook opening 116.

Accordingly, when the pin 105 is received within the hook opening 116 (FIG. 6), and the latch 124 is in the latched position, the pin 105 may be received within the apertures 142 of the slide locks 152 of the latch 124. As such, the pin 105 may be retained not only between the nose 118, the intermediate portion 120, and the connecting portion 122 of the hook body 106, the second forward projection 156 may cooperate to retain the pin 105 within the aperture 142. It will be appreciated that the flange 136 may increase the strength (e.g., the resistance to bending) of the second forward projection 156 for further retaining the pin 105. Also, it will be appreciated that the second forward projection 156 of the first side 126 of the latch 124 may cooperate with the forward projection 156 of the second side 128 of the latch 124 to retain the pin 105 within the hook opening 116. Thus, loads from the pin 105 may be distributed more evenly across the latch 124, thereby ensuring that the latch 124 can withstand loads from the pin 105.

The hitch hook 100 may further include a retainer 158. The retainer 158 may be constructed from one or more rigid and strong materials, such as relatively thick, welded pieces of metal bar stock. The retainer 158 may retain the latch 124 in the latched position and/or retain the latch 124 in the unlatched position.

The retainer 158 may include a first arm 160, a second arm 162, and a cross member 164. The cross member 164 may extend substantially along the lateral axis 23. The first arm 160 and the second arm 162 may be attached at opposite ends of the cross member 164. A portion of the first arm 160 and the second arm 162 may extend rearwardly along the longitudinal axis 21, and a portion may extend at an angle downward to overlap the latch 124. More specifically, the first arm 160 may overlap the first side 128 of the latch 124, and the second arm 162 may overlap the second side 130 of the latch 124.

Terminal ends of the first arm 160 and the second arm 162 may be connected to the latch 124 in some embodiments. For example, the first arm 160 and the second arm 162 may be pivotally connected to the latch 124 at a hinge joint 161. Thus, the retainer 158 may rotate about an axis that is substantially parallel to the lateral axis 23.

Also, the first arm 160 and/or the second arm 162 may include a flange 166. The flange 166 may project outwardly along the lateral axis 23. The flange 166 may provide resistance against bending of the respective arm 160, 162.

The cross member 164 of the retainer 158 may include a first bar 168 and a second bar 170. The first bar 168 and the second bar 170 may both extend between and attach to the first arm 160 and the second arm 162. The first bar 168 and the second bar 170 may be spaced apart along the longitudinal axis 21.

In some embodiments, the cross member 164, the first arm 160, and/or the second arm 162 may define a handle 172 for moving the latch 124 of the hitch hook 100. In some embodiments, the handle 172 may include a grip, a cushioned surface, or other designed feature that is attached to the retainer 158. As such, the user can grasp the handle 172 when moving the latch 124 between its latched and unlatched positions.

In the illustrated embodiment of FIG. 5, the retainer 158 is configured to pivot about the hinge joint 161 from a retracted position (shown in solid lines) and an extended position (shown in phantom lines) relative to the latch 124 and the hook body 106. In the retracted position, the retainer 158 may be retained against the hook body 106 to, thereby, retain the latch 124 in a fixed position relative to the hook body 106. In the extended position, the retainer 158 may be freed from the hook body 106 to, thereby, allow the latch 124 to move between the latched and unlatched positions. It will be appreciated, then, that the handle 172 may be used to manually move the retainer 158 between its retracted and extended positions and may be used to manually move the latch between its latched and unlatched positions.

The retainer 158 may further include at least one biasing member 184. In some embodiments, the biasing member(s) 184 may include a torsion spring that is wound about the hinge joint 161 and that is supported at one end against the flange 166 of the retainer 158 and the flange 136 of the latch 124. The biasing member 184 may bias the retainer 158 toward the retracted position (shown in solid lines) and away from the extended position in some embodiments.

Figure 2:
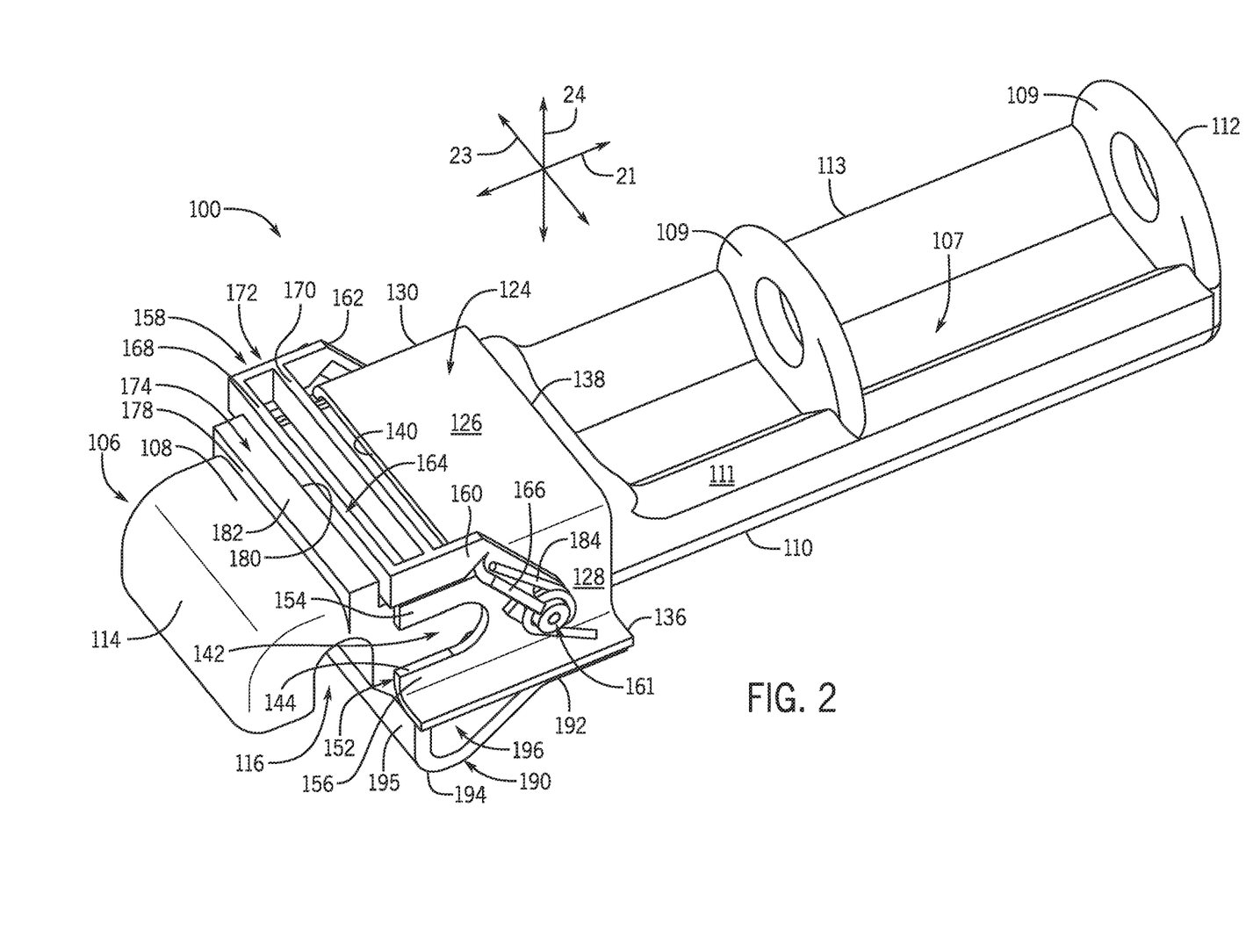
FIG. 2 is a perspective view of an example embodiment of the hitch hook of the present disclosure, which is configured for hitching and unhitching the work vehicles of FIG. 1, wherein the hitch hook is shown in an unlatched position.
Figure 3:
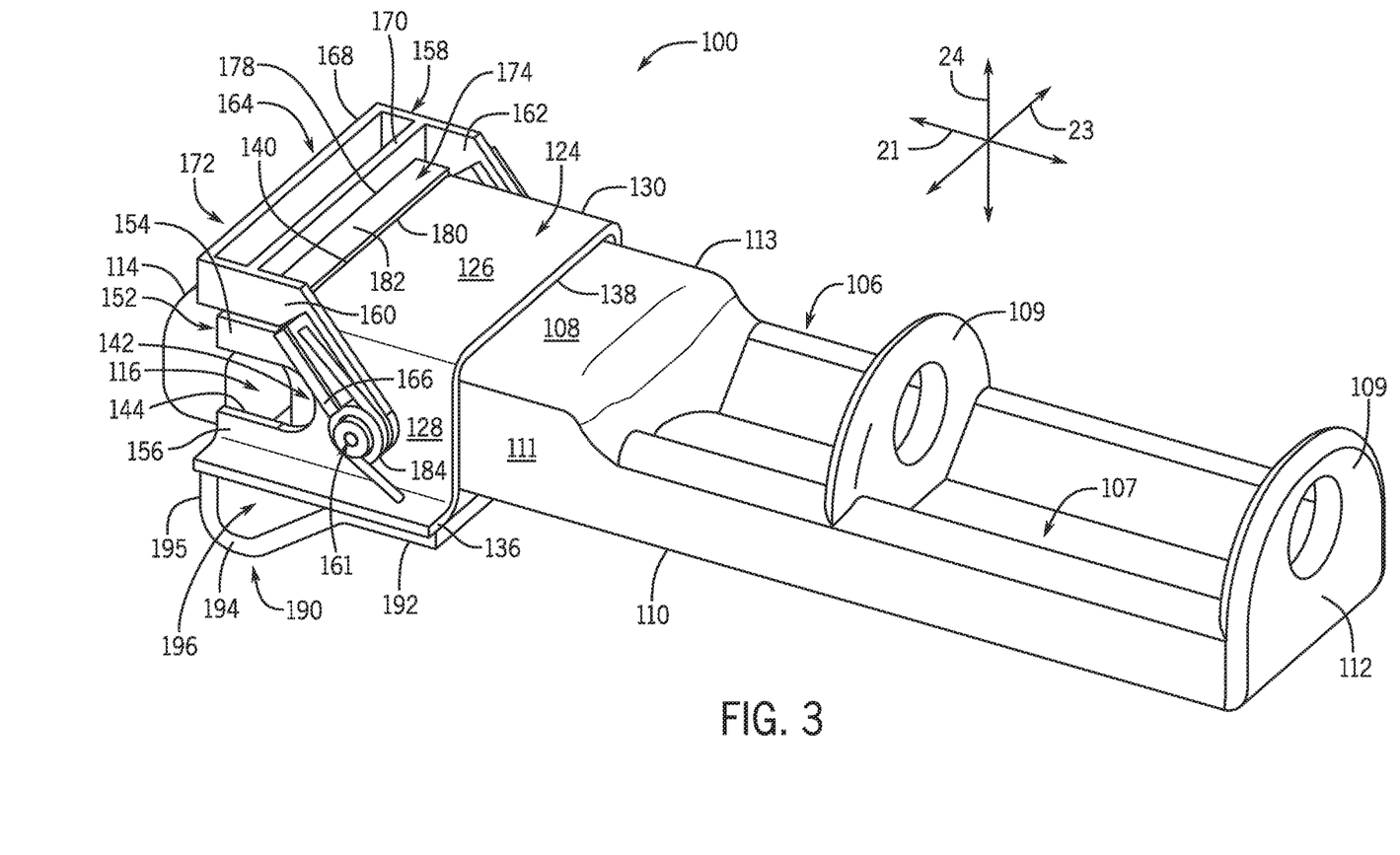
FIG. 3 is a perspective view the hitch hook of FIG. 2, wherein the hitch hook is shown in a latched position.

The retainer 158 may engage the hook body 106 to retain the latch 124 in a fixed position relative to the hook body 106. In other words, interference between the retainer 158 and the hook body 106 may limit the range of sliding movement of the latch 124 relative to the hook body 106. In some embodiments, the retainer 158 engages the first projection 174 of the hook body 106 to retain the latch 124 in a fixed position relative to the hook body 106. Specifically, as shown in FIGS. 2 and 5, the first bar 168 of the retainer 158 may abut against the rearward wall 180 of the first projection 174 to retain the latch 124 in the unlatched position.

Additionally, the retainer 158 and the latch 124 may cooperatively engage the hook body 106 to retain the latch 124 in a fixed position relative to the hook body 106. For example, in the latched position of the latch 124 and in the retracted position of the retainer 158 (FIGS. 3 and 6), the first projection 174 may be received within an opening cooperatively defined by the second bar 170 of the retainer 158 and the forward edge 140 at the intermediate top side 126 of the latch 124.

Thus, the first projection 174 of the hook body 106 may limit sliding movement of the latch 124 and retain the latch 124 in both the latched position and the unlatched position. Also, the biasing member 184 may bias the retainer 158 toward the retracted position to further retain the latch 124 in both the latched position and the unlatched position.

The hitch hook 100 may further include a pin abutment member 190. The pin abutment member may be constructed from rigid, strong material, such as relatively thick, bent sheet metal. The pin abutment member 190 may include a rear section 192 and a forward section 194. The rear section 192 may be substantially flat, and the forward section 194 may project, for example, along the vertical axis 21. The pin abutment member 190 may be attached to the latch 124. For example, the rear section 192 may overlap the bottom side 110 of the hook body 106 and may be attached to the flanges 136 of the latch 124. Accordingly, the latch 124 and the pin abutment member 190 may cooperate to surround the hook body 106 about an axis that is parallel to the longitudinal axis 21. In some embodiments, the rear section 192 may be supported for sliding movement along the bottom side 110 of the hook body 106 as the latch 124 moves between the latched and unlatched positions. The forward section 194 of the pin abutment member 190 may bend vertically downward and back upward toward the terminal ends of the second forward projections 156 of the latch 124. In some embodiments, the forward section 194 may terminate substantially flush with the ends of the second forward projections 156. The forward section 194 may define a forward-facing abutment surface 195. The forward section 194 of the pin abutment member 190 may also define an opening 196. As shown in FIGS. 5 and 6, the second projection 175 may be disposed within the opening 196. As shown in FIG. 5, an inner surface 198 of the forward section 194 may abut against the forward wall 179 of the second projection 175 to limit rearward movement of the pin abutment member 190 and, thus, the latch 124.

Hitching of the hitch hook 100 to the pin 105 will now be described with reference to FIGS. 1, 5, and 6. It will be assumed that the hitch hook 100 is initially positioned as shown in FIG. 5 with the latch 124 in the unlatched position and the retainer 158 in the retracted position (shown in solid lines).

The towing vehicle 20 may back up toward the towed vehicle 22 such that the pin 105 eventually abuts against the abutment surface 195 of the pin abutment member 190 and the inner surface 198 of the pin abutment member 190 abuts against the second projection 175 of the hitch hook 100. This ensures that the pin 105 is in position, ready to be received within the hook opening 116. Then, the towed vehicle 22 may be lowered onto the pin 105 such that the pin 105 is received within the hook opening 116.

Next, the user may grasp the handle 172, pivot the retainer 158 upward to the extended position (shown in phantom lines) and against the biasing force provided by the biasing member 184. With the retainer 158 in the extended position, the user may use the handle 172 to pull the latch 124 forward toward the latched position as shown in FIG. 6. Then, the user may release the handle 172, and the biasing member 184 may bias the retainer 158 back toward the retracted position to retain the latch 124 in the latched position.

To unhitch, the user may reverse the steps discussed above. Specifically, the user may grasp the handle 172, pull up the retainer 158 to the extended position and pull back the latch 124 to the unlatched position of FIG. 5. Then, the towed vehicle 22 may be raised above the pin 105, and the towing vehicle 20 may be driven away from the towed vehicle 22.

Accordingly, the hitch hook 100 of the present disclosure may be user friendly and may facilitate hitching and unhitching of the work vehicles 20, 22. For example, the sliding action allows the latch 124 to smoothly and repeatably move between the latched and unlatched position. Moreover, the handle 172 and retainer 158 may easily pivot and may be used in a natural, ergonomic motion for moving the latch 124. The biasing member 184 may also assist the user in returning the retainer 158 to its retracted position.

Once hitched, the hitch hook 100 may retain the pin 105 in a robust manner. For example, the hook body 106 and the latch 124 may cooperate to retain the pin 105 and may engage the pin 105 at multiple locations for distributing the loads more evenly. Also, the retainer 158 may firmly engage the hook body 106 to retain the latch 124 in both the latched position and the unlatched position.

Moreover, the hitch hook 100 may provide various manufacturing advantages. For example, the hitch hook 100 may be assembled with relatively few parts. Thus, the hitch hook 100 may be manufactured and assembled in an efficient manner.

Figure 7:
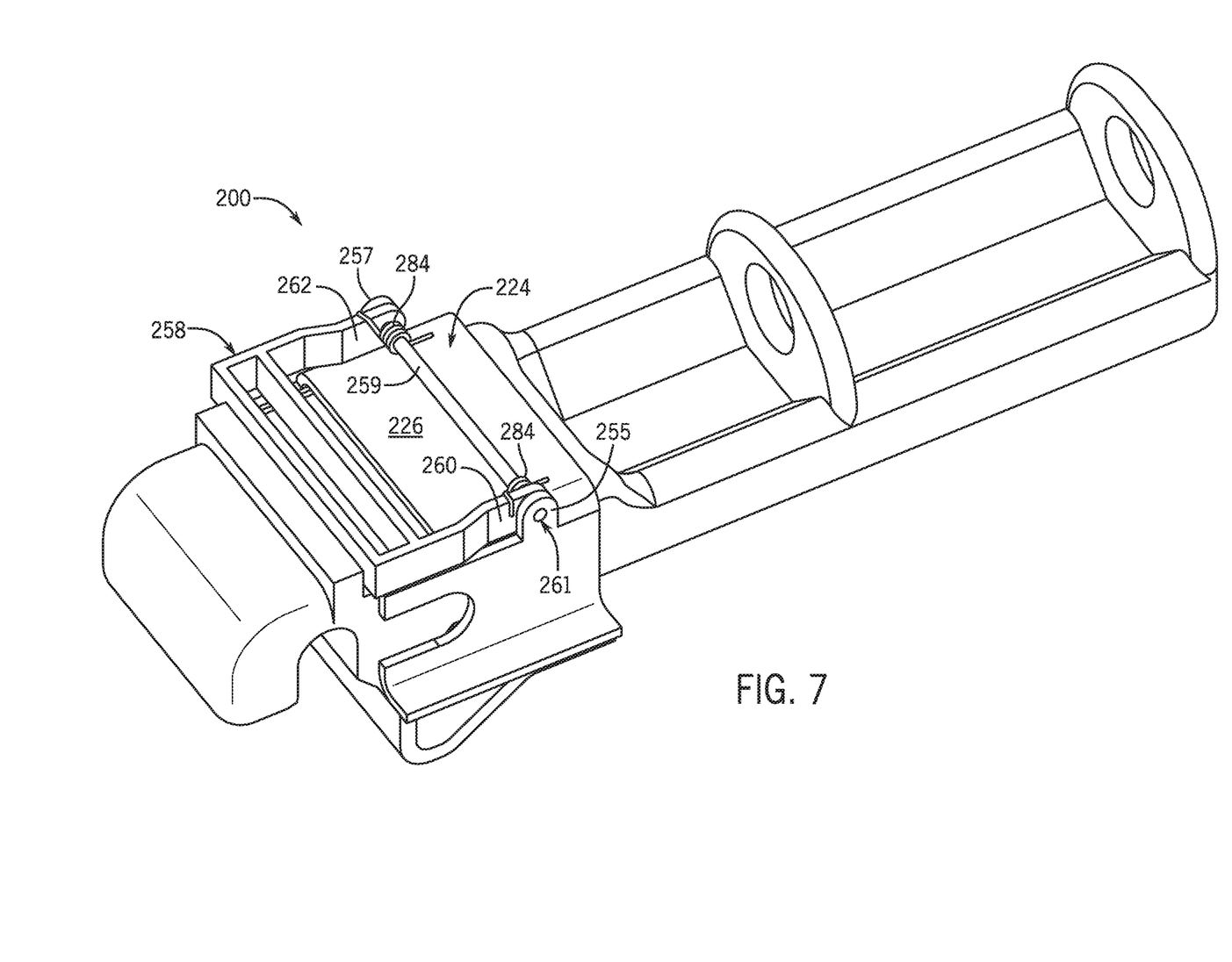
FIG. 7 is a perspective view of another example embodiment of the hitch hook of the present disclosure.

Referring now to FIG. 7, the hitch hook 200 is shown according to another example embodiment. The hitch hook 200 may include one or more features discussed above with respect to FIGS. 2-6. Components that correspond to those of FIGS. 2-6 are indicated with reference numbers increased by 100.

The hinge joint 261 may be different from the embodiment discussed above. For example, the latch 224 may include a first mount 255 and a second mount 257. The first and second mounts 255, 257 may project upward from the intermediate top side 226 of the latch 224 and may be spaced apart laterally. Also, the retainer 258 may include a pin 259. The pin may extend through the first arm 260, the second arm 262 as well as the first mount 255 and the second mount 257. Also, the biasing member 284 may be wound about the pin 259. One end of the biasing member 284 may be supported against the top side 208 of the latch 224 and the opposite end of the biasing member 284 may be supported against the retainer 258. The hitch hook 200 may operate substantially similar to the embodiments discussed above. The hitch hook 200 may provide certain manufacturing and/or assembly advantages. For example, attachment of the retainer 258 to the latch 224 may be relatively simple due to the arrangement of the hinge joint 261. Also, forces may distribute substantially evenly across the hitch hook 200 due to the configuration of the hinge joint 261.

Figure 8:
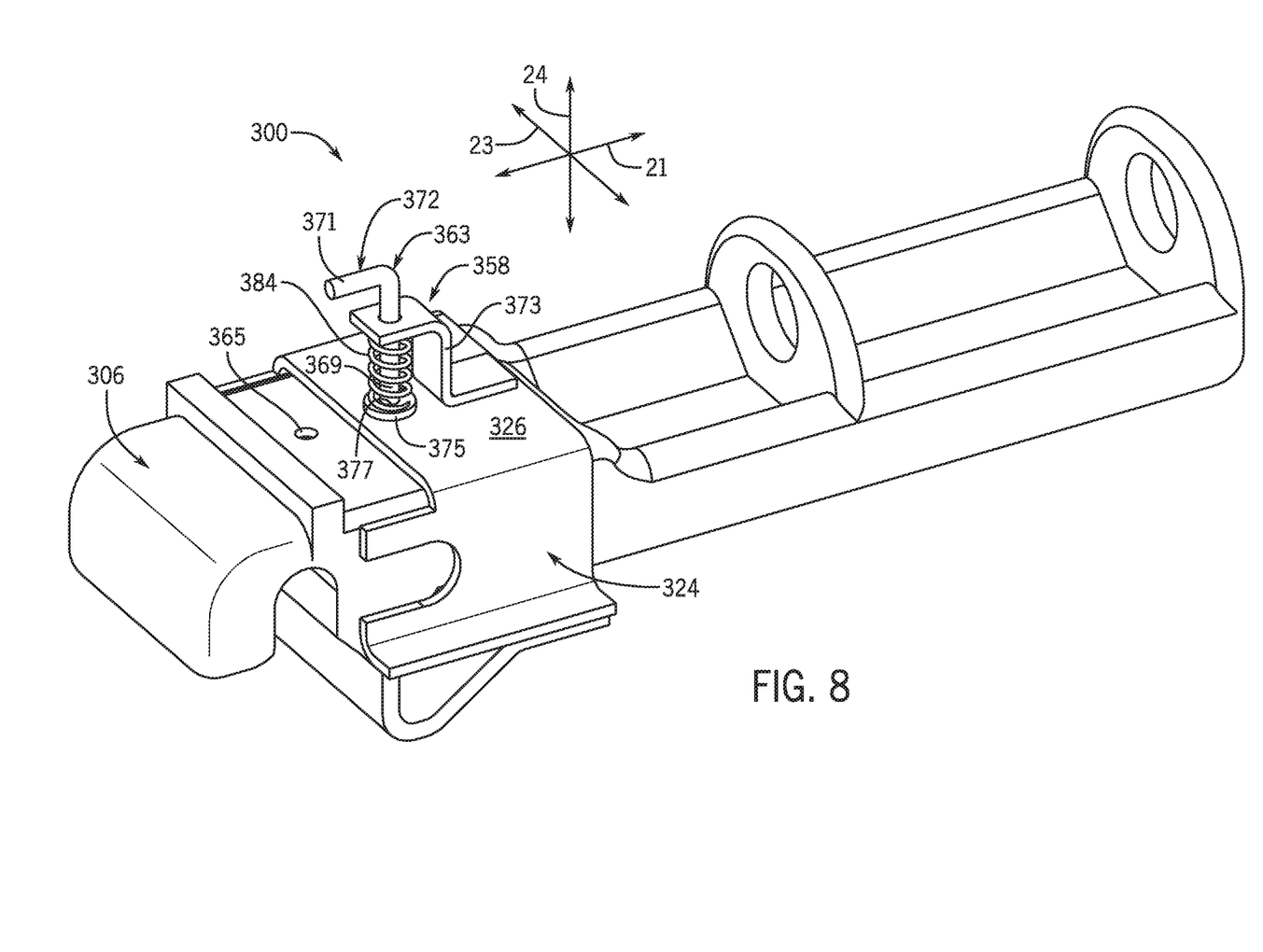
FIG. 8 is a perspective view of another example embodiment of the hitch hook of the present disclosure, wherein the hitch hook is shown in the unlatched position.
Figure 9:
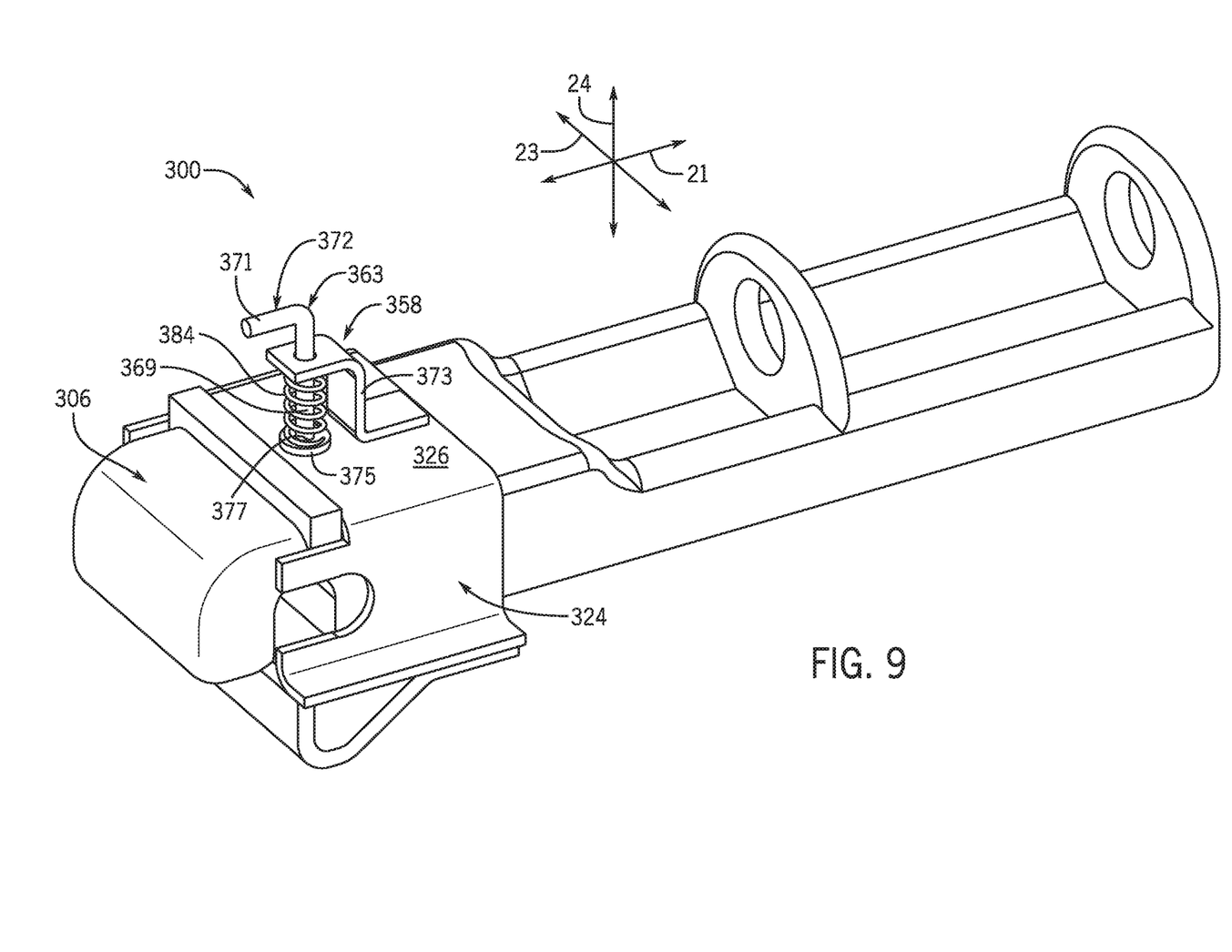
FIG. 9 is a perspective view of the hitch hook of FIG. 8, wherein the hitch hook is shown in the latched position.

Referring now to FIGS. 8 and 9, the hitch hook 300 is shown according to another example embodiment. The hitch hook 300 may include one or more features discussed above with respect to FIGS. 2-6. Components that correspond to those of FIGS. 2-6 are indicated with reference numbers increased by 200.

The retainer 358 may be different from the embodiments discussed above. For example, the retainer 358 may include a detent member 363 that is mounted to the latch 324 and that is configured to be removably received in at least one aperture 365 (FIG. 8) of the hook body 306. When the detent member 363 is received in the aperture 365, the detent member 363 may retain the latch 324 in a fixed position relative to the hook body 106.

In some embodiments, the detent member 363 may be a pin or other elongate member with a first end 369 and a second end 371. The first end 369 may extend along the vertical axis 24, and the second end 371 may be bent transversely relative to the first end 369. Accordingly, the second end 371 may provide the handle 372 for the user. The first end 369 may also include an enlarged engagement portion 375 fixed thereto. The engagement portion 375 may be a disc, flange, or shoulder of the detent member 363

The retainer 358 may also include a mount 373. The mount 373 may be a rigid member that is fixed at one end to the intermediate top side 326 of the latch 324 and that loosely receives the detent member 363, proximate the second end 371. In some embodiments, the mount 373 may extend and project in a serpentine manner from the intermediate top side 326.

The biasing member 384 may be a compression spring that extends between the underside of the mount 373 and the engagement portion 375. As such, the biasing member 384 may bias the detent member 363 downwardly along the vertical axis 24.

The latch 324 may include an aperture 377 that receives the first end 369 of the detent member 363. The aperture 377 may be a through-hole that extends through the intermediate top side 326 of the latch 324. The first end 369 of the detent member 363 may be received in the aperture 377 to be received in the aperture 365 of the hook body 306.

When hitching, the user may grasp the second end 371 and pull upward on the detent member 363 against the biasing force of the biasing member 384, and the user may pull the latch 324 forward from the unlatched position (FIG. 8) to the latched position (FIG. 9). Once the detent member 363 is aligned with the aperture 365 of the hook body 306, the user may release the detent member 363, allowing the biasing member 384 to bias the detent member 363 into the aperture 365. To unhitch the hitch hook 300, the user may pull upward on the detent member 363, and slide the latch 324 rearward. In some embodiments, the hook body 306 may additionally include an aperture (similar to the aperture 365) that receives the detent member 363 to retain the latch 324 in the unlatched position.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A hitch hook for a towing operation between a plurality of work vehicles, the hitch hook comprising:
   a hook body configured to mount on one of the plurality of work vehicles, the hook body including a hook opening configured to removably receive a pin of another of the plurality of work vehicles;
   a latch that is slideably supported on the hook body between a first position and a second position relative to the hook body, wherein the hook opening is open when the latch is in the first position, and wherein the latch includes a forward edge and an opening in the forward edge that receives the pin when the latch is in the second position such that the latch is configured to retain the pin within the hook opening when the latch is in the second position; and
   a retainer that is configured to retain the latch in the second position.

2. The hitch hook of claim 1, wherein the retainer is configured to retain the latch in the first position.

3. The hitch hook of claim 1, wherein the retainer is supported for movement between a retracted position and an extended position relative to the latch;
   wherein the retainer, in the retracted position, is configured to retain the latch in the second position; and
   wherein the retainer, in the extended position, is configured for manually moving the latch between the first position and the second position.

4. The hitch hook of claim 3, wherein the retainer is pivotally mounted to the latch.

5. The hitch hook of claim 4, wherein the latch includes a first mount and a second mount that project from a side of the latch; and
   wherein the retainer includes a first arm that is pivotally connected to the first mount and a second arm that is pivotally connected to the second mount.

6. The hitch hook of claim 3, further comprising a biasing member that biases the retainer toward the retracted position.

7. The hitch hook of claim 1, wherein the retainer includes a detent member that is mounted to the latch; and
   wherein the hook body includes an aperture configured to receive the detent member to retain the latch in the second position.

8. The hitch hook of claim 1, wherein the latch includes a first slide lock and a second slide lock that are configured to receive and retain the pin when the latch is in the second position.

9. The hitch hook of claim 8, wherein the hook body includes a first side and a second side, the first side being opposite the second side;
    wherein the hook opening extends laterally between the first side and the second side; and
    wherein the first slide lock is disposed proximate the first side and the second slide lock is disposed proximate the second side when the latch is in the second position.

10. The hitch hook of claim 9, wherein the hook body includes a top side that extends laterally between the first side and the second side;
    wherein the latch includes an intermediate top side that extends between the first slide lock and the second slide lock; and
    wherein the intermediate top side is slideably supported on the top side of the hook body.

11. The hitch hook of claim 1, wherein the hook body includes a projection; and
    wherein the retainer is configured to abut the projection to retain the latch in the second position.

12. The hitch hook of claim 11, wherein the projection is configured to be received between the retainer and a forward edge of the latch to retain the latch in the second position.

13. The hitch hook of claim 12, wherein the retainer is configured to abut the projection to retain the latch in the first position.

14. The hitch hook of claim 1, further comprising a pin abutment member that is supported by the latch;
    the pin abutment member configured to abut against the pin to indicate that the pin is generally aligned with the hook opening when hitching the hitch hook and the pin.

15. A method of operating a hitch hook comprising:
    receiving a pin within a hook opening of a hook body while a latch that is supported by the hook body is in a first position;
    sliding the latch from the first position to a second position, the latch including a forward edge and an opening in the forward edge receiving the pin when the latch is in the second position, the latch retaining the pin within the hook body when in the second position; and
    retaining the latch in the second position with a retainer.

16. The method of claim 15, further comprising moving the retainer between a retracted position to an extended position;
    wherein sliding the latch includes sliding the latch when the retainer is in the extended position; and
    wherein retaining the latch includes retaining the latch when the retainer is in the retracted position.

17. The method of claim 15, further comprising abutting the pin against a pin abutment member of the hitch hook to indicate that the pin is generally aligned with the hook opening before receiving the pin within the hook opening.

18. A work vehicle comprising:
    a chassis; and
    a hitch hook that is mounted to the chassis, the hitch hook including:
    a hook body configured to mount on one of the plurality of work vehicles, the hook body including a hook opening configured to removably receive a pin of another of the plurality of work vehicles, the hook body including a projection;
    a latch that is slideably supported on the hook body between a first position and a second position relative to the hook body, wherein the hook opening is open when the latch is in the first position, and wherein the latch is configured to retain the pin within the hook opening when the latch is in the second position;
    a pin abutment member that is supported by the latch and that is configured to abut against the pin to indicate that the pin is generally aligned with the hook opening when hitching the hitch hook and the pin; and
    a retainer that is pivotally attached to the latch for movement between a retracted position and an extended position, the retainer configured to abut the projection and retain the latch in the first position when the retainer is in the retracted position, the retainer and the latch configured to abut the projection and retain the latch in the second position when the retainer is in the retracted position, and the retainer configured for moving the latch between the first position and the second position when the retainer is in the extended position;
    wherein the retainer includes a handle configured for manually moving the latch between the first position and the second position.

* * * * *

UNITED STATES PATENT AND TRADEMARK OFFICE
CERTIFICATE OF CORRECTION

PATENT NO. : 10,343,469 B2
APPLICATION NO. : 15/460842
DATED : July 9, 2019
INVENTOR(S) : Faust et al.

Page 1 of 1

It is certified that error appears in the above-identified patent and that said Letters Patent is hereby corrected as shown below:

In the Claims

In Column 13, Claim 12, Line 23, delete "and a forward" and insert -- and the forward --, therefor.

In Column 14, Claim 18, Line 15, delete "of the plurality" and insert -- of a plurality --, therefor.

Signed and Sealed this
Fifth Day of November, 2019

Andrei Iancu
*Director of the United States Patent and Trademark Office*